(12) United States Patent
Ludolph et al.

(10) Patent No.: US 10,808,075 B2
(45) Date of Patent: *Oct. 20, 2020

(54) SUBSTOICHIOMETRIC ALKOXYLATED POLYETHERS

(71) Applicant: BASF SE, Ludwigshafen am Rhein (DE)

(72) Inventors: Bjoern Ludolph, Ludwigshafen (DE); Steffen Maas, Ludwigshafen (DE); Sophia Ebert, Ludwigshafen (DE); Patrick Delplancke, Cincinnati, OH (US); Frank Huelskoetter, Cincinnati, OH (US)

(73) Assignee: BASF SE, Ludwigshafen am Rhein (DE)

( * ) Notice: Subject to any disclaimer, the term of this patent is extended or adjusted under 35 U.S.C. 154(b) by 0 days.

This patent is subject to a terminal disclaimer.

(21) Appl. No.: 16/062,149

(22) PCT Filed: Dec. 8, 2016

(86) PCT No.: PCT/EP2016/080305
§ 371 (c)(1),
(2) Date: Jun. 14, 2018

(87) PCT Pub. No.: WO2017/102556
PCT Pub. Date: Jun. 22, 2017

(65) Prior Publication Data
US 2018/0371165 A1    Dec. 27, 2018

(30) Foreign Application Priority Data

Dec. 18, 2015  (EP) .................... 15201042

(51) Int. Cl.
| | |
|---|---|
| C08G 65/26 | (2006.01) |
| C08G 65/326 | (2006.01) |
| C08G 65/327 | (2006.01) |
| C08G 73/02 | (2006.01) |
| C08G 65/334 | (2006.01) |
| C08G 65/333 | (2006.01) |
| C08G 65/335 | (2006.01) |
| C11D 1/00 | (2006.01) |
| C10M 133/08 | (2006.01) |
| C10N 20/00 | (2006.01) |

(52) U.S. Cl.
CPC ..... *C08G 65/2624* (2013.01); *C08G 65/2609* (2013.01); *C08G 65/326* (2013.01); *C08G 65/327* (2013.01); *C08G 65/333* (2013.01); *C08G 65/335* (2013.01); *C08G 65/3346* (2013.01); *C08G 73/022* (2013.01); *C08G 73/024* (2013.01); *C10M 133/08* (2013.01); *C11D 1/00* (2013.01); *C10M 2215/042* (2013.01); *C10N 2020/071* (2020.05)

(58) Field of Classification Search
CPC ............ C08G 65/2624; C08G 65/2609; C08G 65/322; C08G 65/326; C08G 65/327; C08G 65/34; C08G 65/14
See application file for complete search history.

(56) References Cited

U.S. PATENT DOCUMENTS

| | | | |
|---|---|---|---|
| 4,448,992 A | 5/1984 | Diery et al. | |
| 2009/0124529 A1* | 5/2009 | Danziger | C08G 73/02 510/276 |
| 2010/0234631 A1* | 9/2010 | Misske | C08G 73/024 558/27 |
| 2017/0175038 A1 | 6/2017 | Delplancke et al. | |
| 2017/0175039 A1 | 6/2017 | Delplancke et al. | |

FOREIGN PATENT DOCUMENTS

| | | |
|---|---|---|
| EP | 0074618 A1 | 3/1983 |
| EP | 0352776 A2 | 1/1990 |
| WO | 2009060060 A1 | 5/2009 |
| WO | 2011032640 A2 | 3/2011 |
| WO | 2014012812 A1 | 1/2014 |

OTHER PUBLICATIONS

International Search Report and Written Opinion for International Application No. PCT/EP2016/080305, dated Feb. 7, 2017, 10 pages.

* cited by examiner

*Primary Examiner* — Shane Fang
(74) *Attorney, Agent, or Firm* — Armstrong Teasdale LLP

(57) ABSTRACT

Provided herein are polymers obtainable by a process including the steps a) and b) described below. In Step a) at least one component a1) is condensed to obtain a polyether having remaining hydroxyl groups. Component a1) is at least one component selected from N-(hydroxyalkyl) amins according to formula (Ia) and/or (Ib) as defined below. Besides component a1), further components can be present in the condensation step a). In step b) a part of the remaining hydroxyl groups are reacted with at least one alkylene oxide. The alkoxylation according to step b) is carried out in a substoichiometric way. The ratio of i) the alkylene oxide versus ii) the sum of the amount of the remaining hydroxyl groups is >0:1 to <1:1 [mol/mol]. Further provided herein is a process for preparing such polymers and derivatives of the polymers by quaternization, protonation, sulphation and/or phosphation.

16 Claims, No Drawings

US 10,808,075 B2

SUBSTOICHIOMETRIC ALKOXYLATED POLYETHERS

FIELD OF THE INVENTION

The present invention relates to polymers obtainable by a process comprising the steps a) and b). In Step a) at least one component a1) is condensed in order to obtain a polyether having remaining hydroxyl groups and optionally remaining secondary amino groups. Component a1) is at least one component selected from N-(hydroxyalkyl) amins according to formula (Ia) and/or (Ib) as defined below. Besides component a1), further components can be present in the condensation step a). In step b) a part of the remaining hydroxyl groups and optionally a part of the remaining secondary amino group of the polyether obtained in step a) are reacted with at least one alkylene oxide. The alkoxylation according to step b) is carried out in a substoichiometric way, which means that the ratio of i) the alkylene oxide versus ii) the sum of the amount of the remaining hydroxyl groups and optionally the remaining secondary amino groups is >0:1 to <1:1 [mol/mol]. The present invention further relates to a process for preparing such polymers well as to derivatives of said polymers obtainable by quaternization, protonation, sulphation and/or phosphation.

BACKGROUND

WO 2009/060060 relates to polymers obtainable by condensation of N-(hydroxy-alkyl)amines and reacting the remaining hydroxy and/or secondary amino groups of the condensation product with alkylene oxides and to derivatives obtainable by quaternization, protonation, sulphation and/or phosphation of said polymers, as well as to a process for preparing said polymers and to a process for preparing said derivatives. The alkoxylation of the condensation product for obtaining the polymers according to WO 2009/060060 is carried out at least equimolar, preferably with an access of alkylene oxide versus the remaining hydroxyl groups of the respective polyether. The polymers and/or the respective derivatives according to WO 2009/060060 display amphiphilicity. They have a balanced ratio of hydrophilic and hydrophobic structural elements and they show a good solubility in water.

EP-A 0 352 776 relates to condensates of certain amino-substituted s-triazines, formaldehyde and alkanolamines. These condensates can be used, with or without alkoxylation, in forming polyurethanes having desirable burn properties. Unlike melamine and certain melamine derivates, only small amounts of the present condensates are required to provide effective flame retardancy.

EP-A 0 074 618 relates to addition products obtained by the reaction of triethanolamine condensation products of the formula (I) with bisglycidyl ethers of the formula (II), wherein the bisglycidyl ethers comprise at least one bisphenol diether moiety. The addition products according EP-A 0 074 618 can be employed as demulsifier of oil-water-emulsions, as lubricants and as paper additive.

WO 2014/012812 relates to branched polyetheramine polyols with a Hazen colour number (determined according to DIN ISO 6271) in the range of from 100 to 600 (APHA), based on a polycondensation product of at least one trialkanolamine. The branched poletheramine polyols according to WO 2014/012812 can be employed in pigment dispersions with at least one pigment and water. Such pigment dispersions in turn can be employed in paints or lacquers.

SUMMARY

WO 2011/032640 relates to the use of alkoxylated trialkanolamine condensates for separating water from oil emulsions, said condensates being obtained by condensation of trialkanolamines, with alkaline catalysis, and subsequent alkoxylation with at least one $C_2$ to $C_4$ alkylene oxide, having a number-average molecular weight between 500 and 500,00 g/mol, comprising between 2 and 250 trialkanolamine units, and an average alkoxylation degree of between 1 and 200 alkylene oxide units per free OH group, in quantities of between 0.0001 and 5 wt. %, in relation to the oil content of the emulsion to be split.

In the field of cleaning compositions various type of polymers are well established as components within such cleaners. Depending on the intended use, different types of polymers can be employed. Well-known problems/tasks in the field of cleaning compositions are as follows:

Cooked-, baked- and burnt-on soils are amongst the most severe types of soils to remove from surfaces. Traditionally, the removal of cooked-, baked- and burnt-on soils from cookware and tableware requires soaking the soiled object prior to mechanical action. Manual dishwashing processes require a tremendous rubbing effort to remove cooked-, baked- and burnt-on soils and this can be detrimental to the safety and condition of the cookware/tableware.

Another problem faced in manual dishwashing is grease removal, in particular grease removal from hydrophobic substrates such as plastics. Grease removal also includes the removal of ordinary fat residues such as residues obtained from the preparation/cooking of burgers and/or other meat.

Users not only seek good cleaning but they also expect the washed items to be pleasant to the touch and not to be left feeling greasy to the touch during and after the rinse.

Hand dishwashing trends are changing. Traditionally, the washing up has been done in a sink full of water with the detergent diluted in it. Nowadays, the trend is toward the use of a cleaning implement, such as a sponge. The cleaning composition is dosed onto the sponge, before or after the sponge is wetted, a soiled item is then wiped and subsequently rinsed under running water. This new way of hand dishwashing, sometimes referred to as direct application, places the cleaning composition in a new environment that needs to be taken into account for the design of the composition. With the new preference of using direct application, there is a need to provide a cleaning composition that performs well under the new using conditions, in particular for the removal of polymerized grease such as that left from cooked-, baked- and burnt-on soils.

The object of the present invention is to provide novel polymer obtainable by a condensation process of at least one compound based on N-(hydroxyalkyl)amins.

The object is achieved by a polymer obtainable by a process comprising the steps a) and b):

a) condensation of at least one component a1), optionally at least one component a2) and/or optionally at least one component a3), which are defined as follows:

a1) is at least one compound selected from N-(hydroxyalkyl)amines of formulae (I.a) and/or (I.b),

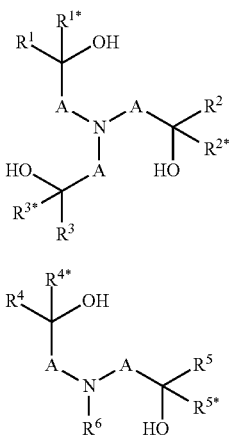

(I.a)

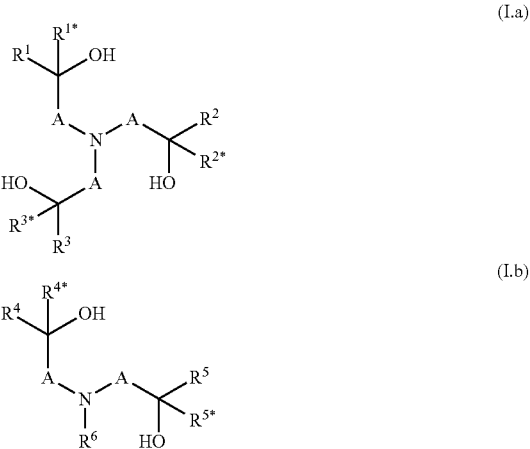

(I.b)

wherein
A are independently selected from $C_1$-$C_6$-alkylene,
$R^1$, $R^{1*}$, $R^2$, $R^{2*}$, $R^3$, $R^{3*}$, $R^4$, $R^{4*}$, $R^5$, $R^{5*}$ and $R^6$ are independently of one another selected from hydrogen, alkyl, cycloalkyl or aryl, wherein the last three mentioned radicals may be optionally substituted, and a2) is at least one compound selected from polyols of formula $Y'(OH)_n$,
wherein
n is an integer from 2 to 4 and
Y denotes a bivalent, trivalent or tetravalent aliphatic, cycloaliphatic or aromatic radical having 2 to 10 carbon atoms, and a3) is at least one compound selected from polyamines of formula $Y'(NHR^y)_m$,
wherein
m is an integer from 2 to 4,
Y denotes a bivalent, trivalent or tetravalent aliphatic, cycloaliphatic or aromatic radical having 2 to 10 carbon atoms, and
$R^y$ has one of the meanings given for $R^6$ or two radicals $R^y$ together may form a $C_1$-$C_6$-alkylene group,
wherein the sum of the amount of components a1), a2) and a3) is more than 70 wt.-% in relation to the sum of the amount of all monomers employed in the condensation according to step a) in order to obtain a polyether having remaining hydroxyl groups and optionally remaining secondary amino groups, b) reacting a part of the remaining hydroxy groups and optionally a part of the remaining secondary amino groups of the polyether obtained in step a) with at least one alkylene oxide, wherein the ratio of i) the alkylene oxide versus ii) the sum of the amount of the remaining hydroxyl groups and optionally the remaining secondary amino groups is >0:1 to <1:1 [mol/mol].

The polymers according to the present invention have advantageous properties, they can be successfully employed the field of cleaning compositions, such as machine and/or hand washing cleaning compositions. Compositions based on polymers according to the present invention provide good cleaning properties, in particular good grease cleaning properties, they are well suited for especially cooked-, baked- and burnt-on soil removal. The same advantageous properties as for the polymers according to the present invention also apply for the derivatives of the polymers according to the present invention.

The polymers according to the present invention (as well as corresponding derivatives) also have an improved performance in the field of fat removal at low temperatures. By consequence, the polymers according to the present invention can be successfully employed in cleaning compositions, in particular in manual dish washing cleaning compositions. Besides cooked-, baked- and burnt-on soils, the respective cleaning compositions based on polymers according to the present invention (as well as derivatives thereof) can also be employed in manual dish washing composition for grease removal from hydrophobic substrates such as plastics.

The invention is specified in more detail as follows:
The invention relates to a polymer obtainable by a process comprising the steps a) and b).
In step a) at least one component a1), optionally at least one compound a2) and/or optionally at least one compound a3) are condensated.
a1) is at least one compound selected from N-(hydroxyalkyl) amines of formulae (I.a) and/or (I.b), (I.a)

(I.b)

wherein
A are independently selected from $C_1$-$C_6$-alkylene,
$R^1$, $R^{1*}$, $R^2$, $R^{2*}$, $R^3$, $R^{3*}$, $R^4$, $R^{4*}$, $R^5$, $R^{5*}$ and $R^6$ are independently of one another selected from hydrogen, alkyl, cycloalkyl or aryl, wherein the last three mentioned radicals may be optionally substituted.

The term "alkyl" as used herein and in the term alkoxy refers to saturated straight-chain or branched hydrocarbon radicals. $C_1$-$C_4$-alkyl refers to saturated straight-chain or branched hydrocarbon radicals having 1 to 4 carbon atoms such as methyl, ethyl, propyl, 1-methylethyl, butyl, 1-methylpropyl, 2-methylpropyl and 1,1-dimethylethyl. Optionally substituted alkyl refers to an alkyl radical which is unsubstituted or wherein a part or all of the hydrogen atoms are replaced by hydroxy, halogen, cyano or $C_1$-$C_4$-alkoxy. Preferably alkyl is unsubstituted.

The term "cycloalkyl" as used herein refers to saturated or partially unsaturated mono- or bicyclic hydrocarbon radicals. Preferably the term cycloalkyl relates to monocyclic hydrocarbon radicals having 3 to 8, in particular 3 to 6 carbon atoms ($C_3$-$C_8$-cycloalkyl, $C_3$-$C_6$-cycloalkyl). Examples of such preferred cycloalkyl radicals are cyclopropyl, cyclobutyl, cyclopentyl, cyclohexyl, cycloheptyl and cyclooctyl. Optionally substituted cycloalkyl refers to a cycloalkyl radical which is unsubstituted or wherein a part or all of the hydrogen atoms are replaced by hydroxy, halogen, cyano, $C_1$-$C_4$-alkyl or $C_1$-$C_4$-alkoxy. Preferably cycloalkyl is unsubstituted or carries 1, 2 or 3 $C_1$-$C_4$-alkyl radicals.

The term "$C_1$-$C_6$-alkylene" as used herein refers to a saturated, divalent straight chain or branched hydrocarbon chains of 1, 2, 3, 4, 5 or 6 carbon groups, examples including methylene, ethane-1,2-diyl, propane-1,3-diyl, propane-1,2-diyl, 2-methylpropane-1,2-diyl, 2,2-dimethylpropane-1,3-diyl, butane-1,4-diyl, butane-1,3-diyl (=1-methylpropane-1,3-diyl), butane-1,2-diyl, butane-2,3-diyl, 2-methyl-butan-1,3-diyl, 3-methyl-butan-1,3-diyl (=1,1-dimethylpropane-1,3-diyl), pentane-1,4-diyl, pentane-1,5-diyl, pentane-2,5-diyl, 2-methylpentane-2,5-diyl (=1,1-dimethylbutane-1,3-diyl) and hexane-1,6-diyl.

The term "aryl" as used herein refers to phenyl or naphthyl, preferably phenyl. Optionally substituted aryl refers to an aryl radical which is unsubstituted or wherein a part or all of the hydrogen atoms are replaced by hydroxy, halogen, cyano, $C_1$-$C_4$-alkyl or $C_1$-$C_4$-alkoxy. Preferably aryl is unsubstituted or carries 1, 2 or 3 $C_1$-$C_4$-alkyl radicals.

Preferably in component a1) in formulae (I.a) and/or (I.b)
i) A is a methylene group, which is unsubstituted or carries one substituent selected from $C_1$-$C_4$-alkyl, and/or
ii) $R^1$, $R^{1*}$, $R^2$, $R^{2*}$, $R^3$, $R^{3*}$, $R^4$, $R^{4*}$, $R^5$, $R^{5*}$ and $R^6$ are independently of one another selected from hydrogen and $C_1$-$C_4$-alkyl, More preferably, the compound according to formula (I.a) is selected from triethanolamine, triisopropanolamine and tributan-2-olamine and/or the compound according to formula (I.b) is selected from N-methyldiethanolamine, N,N-bis-(2-hydroxypropyl)-N-methylamine, N,N-bis-(2-hydroxybutyl)-N-methylamine, N-isopropyldiethanolamine, N-n-butyldiethanolamine, N-sec-butyldiethanolamine, N-cyclohexyldiethanolamine, N-benzyldiethanolamine, N-4-tolyldiethanolamine and N,N-Bis-(2-hydroxvethyl)-anilin.

If present, the optional component a2) is at least one compound selected from polyols of formula Y'(OH)$_n$, wherein
n is an integer from 2 to 4 and
Y denotes a bivalent, trivalent or tetravalent aliphatic, cycloaliphatic or aromatic radical having 2 to 10 carbon atoms.

Preferably in component a2) the polyol is an aliphatic polyol, a cycloaliphatic polyol or an arylaliphatic polyol.

More preferably in component a2) the polyol is ethylene glycol, propylene glycol, butylene glycol, glycerine, tri(hydroxymethyl)ethane, tri(hydroxymethyl)propane or pentaerythrit, 1,4-dihydroxycyclohexane or 1,4-bis-(hydroxymethyl)benzene.

If present, the optional component a3) is at least one compound selected from polyamines of formula Y'(NHR$^y$)$_m$,
wherein
m is an integer from 2 to 4,
Y denotes a bivalent, trivalent or tetravalent aliphatic, cycloaliphatic or aromatic radical having 2 to 10 carbon atoms, and
R$^y$ has one of the meanings given for $R^6$ or two radicals R$^y$ together may form a $C_1$-$C_6$-alkylene group.

Preferably in component a3) the polyamine is selected from ethylenediamine, N,N'-dimethylethylenediamine, N,N'-diethylethylenediamine, 1,2-diaminopropane, 1,3-diaminopropane, 1,2-diaminocyclohexane, 1,3-diaminocyclohexane, 1,4-diaminocyclohexane or piperazine.

The sum of the amount of components a1), a2) and a3) is more than 70 wt.-% in relation to the sum of the amount of all monomers employed in the condensation according to step a) in order to obtain a polyether having remaining hydroxyl groups and optionally remaining secondary amino groups. For the sake of completeness, it is indicated that components a1), a2) and a3) are employed as monomers within the condensation according to step a) of the present invention.

In one embodiment of the invention the sum of the amount of components a1), a2) and a3) is more than 90%, more preferably more than 95%, even more preferably more than 99,5%, most preferably 100%, in relation to the sum of the amount of all monomers employed in the condensation according to step a).

In another embodiment of the invention
i) 50 to 100 wt.-%, preferably 75 to 100 wt.-%, most preferably 95 to 100 wt.-% of component a1),
ii) 0 to 50 wt.-%, preferably 0 to 25 wt.-%, most preferably 0 to 5 wt.-% of component a2), and
iii) 0 to 50 wt.-%, preferably 0 to 25 wt.-%, most preferably 0 to 5 wt.-% of component a3)
are employed in relation to the sum of the amount of all monomers of step a).

In a further embodiment of the invention at least 95 wt.-% of all monomers employed in step a) are selected from component a1), component a1) is preferably selected from at least one compound according to formula (Ia).

More preferably at least 99% wt.-% of all monomers employed in step a) are selected from component a1), component a1) is preferably selected from at least one compound according to formula (I.a), Most preferably 100% wt.-% of all monomers employed in step a) are selected from component a1), component a1) is preferably selected from at least one compound according to formula (I.a).

The condensation of at least one component a1) and optionally further monomer such as components a2) and/or a3), preferably the condensation of the at least one N-(hydroxyalkyl)amine of formulae (I.a) and/or (I.b) can be performed under the conditions given in e.g. EP 0 441 198 or U.S. Pat. No. 5,393,463 or WO2014/012812.

The term "condensation" as used herein refers to a chemical reaction wherein a covalent bond between two corresponding functional groups is formed together with the formal loss of a small molecule such as water. A condensation as such according to step a) of the present invention is known to a person skilled in the art. Preferably the term condensation refers to an etherification together with a dehydration reaction.

The N-(hydroxyalkyl)amine polyethers are usually prepared by condensing the N-(hydroxyalkyl)amines of formulae (I.a) and/or (I.b) in the presence of an acid, preferably phosphorous acid ($H_3PO_3$) and/or hypophosphorous acid ($H_3PO_2$). The acid, in particular the phosphorous acid and/or hypophosphorous acid, is preferably used in an amount of from 0.05 to 2% by weight (calculated as 100% acid) and preferably from 0.1 to 1.0% by weight of the N-(hydroxyalkyl)amine(s) to be condensed.

Usually, the condensation (reaction) is effected using water withdrawing conditions familiar to a skilled person, such as distilling off the water of the reaction.

Usually, the temperature used for the condensation is in the range of 120 to 280° C., preferably 150 to 260° C. and more preferably 180 to 240° C. The reaction is usually carried out over a period of from 1 to 16 hours and preferably from 2 to 8 hours. Advantageously, the degree of condensation is controlled by varying the temperature and time of reaction.

The viscosity of the resulting condensation products is usually in the range of 1 000 to 50 000 mPa·s, preferably 2 000 to 20 000 mPa·s, and more preferably 3 000 to 10 000 mPa·s (measured, in all cases, on the undiluted product at 20° C.).

The number average molecular weight of the resulting condensation products is usually in the range of 250 to 50 000 g/mol, preferably 500 to 25 000 g/mol, and more preferably 1 000 to 15 000 g/mol.

The hydroxyl number of the resulting condensation products is usually in the range of 200 to 1 500 mg(KOH)/g, and preferably 300 to 1 000 g/mol.

The condensation of the N-(hydroxyalkyl)amines can also be effected by heating the compounds of formulae (I.a) and/or (I.b) and the acid, as defined above, in the presence of an effective amount of an additional catalyst, such as zinc halides or aluminium sulphate or zinc halide/carboxylic acid or $Al_2(SO_4)_3$/carboxylic acid, as described in U.S. Pat. No. 4,505,839. Preferred additional catalysts are $ZnCl_2$/acetic acid and $Al_2(SO_4)_3$/acetic acid. Generally the additional catalyst if present is used in an amount of 0.01 to 5.0% by weight based on the of the N-(hydroxyalkyl)amine(s) to be condensed, preferably about 0.01 to 1.25% by weight.

In one embodiment of the invention the addition of formaldehyde and/or triazines as monomers in the condensation step a) is excluded. In particular melamine is excluded as a monomer in step a) in this embodiment.

In an embodiment of the invention, in step a) at least one component a1) selected from from N-(hydroxyalkyl)amines of formulae (I.a) is condensated.

In another embodiment of the invention in step a) at least one component a1) selected from from N-(hydroxyalkyl) amines of formulae (I.a) and at least one component a2) are condensated.

In a further embodiment of the invention in step a) at least one component a1) selected from from N-(hydroxyalkyl) amines of formulae (I.a) and at least one component a3) are condensated.

In a further embodiment of the invention in step a) at least one component a1) selected from from N-(hydroxyalkyl) amines of formulae (I.a), at least one component a2) and at least one component a3) are condensated.

In an embodiment of the invention, in step a) at least one component a1) selected from from N-(hydroxyalkyl)amines of formulae (I.b) is condensated.

In another embodiment of the invention in step a) at least one component a1) selected from from N-(hydroxyalkyl) amines of formulae (I.b) and at least one component a2) are condensated.

In a further embodiment of the invention in step a) at least one component a1) selected from N-(hydroxyalkyl)amines of formulae (I.b) and at least one component a3) are condensated.

In a further embodiment of the invention in step a) at least one component a1) selected from from N-(hydroxyalkyl) amines of formulae (I.b), at least one component a2) and at least one component a3) are condensated.

In an embodiment of the invention, in step a) at least one component a1) selected from from N-(hydroxyalkyl)amines of formulae (I.b), wherein $R^6$ is hydrogen, is condensated.

In another embodiment of the invention in step a) component a1) selected from from N-(hydroxyalkyl)amines of formulae (I.b), wherein $R^6$ is hydrogen, and at least one component a2) are condensated.

In a further embodiment of the invention in step a) at least one component a1) selected from N-(hydroxyalkyl)amines of formulae (I.b), wherein $R^6$ is hydrogen, and at least one component a3) are condensated.

In a further embodiment of the invention in step a) at least one component a1) selected from N-(hydroxyalkyl)amines of formulae (I.b), wherein $R^6$ is hydrogen, at least one component a2) and at least one a3) are condensated.

According to step b) of the present invention, a part of the remaining hydroxy groups and optionally a part of the remaining secondary amino groups of the polyether obtained in step a) is (are) reacted with at least one alkylene oxide, wherein the ratio of i) the alkylene oxide versus ii) the sum of the amount of the remaining hydroxyl groups and optionally the remaining secondary amino groups is >0:1 to <1:1 [mol/mol].

In step b) the at least one alkylene oxide is preferably selected from epoxyethane, epoxypropane, 1,2-epoxybutane, (butylene oxide), 2,3-epoxybutane, 1,2-epoxy-2-methylpropane, 1,2-epoxypentane, 2,3-epoxypentane, 1,2-epoxy-2-methylbutane, 2,3-epoxy-2-methylbutane, 1,2-epoxyhexane, 2,3-epoxyhexane, 3,4-epoxyhexane, 1,2-epoxyethylenebenzene, 1,2-epoxydecane (decene oxide), 1,2-epoxydodecane (dodecene oxide), 1,2-epoxytetradecane and/or 1,2-epoxyhexadecane.

More preferably the at least one alkylene oxide is selected from epoxyethane and/or epoxypropane.

Preferably any further alkylene oxide is selected from the same groups as the at least one alkylene oxide.

The term "alkylene oxide" as used herein relates to alkyl or alkylaryl compounds carrying at least one, preferably 1 or 2, in particular 1 epoxy group at the alkyl moieties of the compound. Examples of alkyl compounds carrying one epoxy group are epoxyethane (=ethylene oxide), epoxypropane (=propylene oxide), 1,2-epoxybutane (=alpha butylene oxide), 2,3-epoxybutane (=beta butylene oxide), 1,2-epoxy-2-methylpropane (=isobutylene oxide), 1,2-epoxypentane, 2,3-epoxypentane, 1,2-epoxy-2-methylbutane, 2,3-epoxy-2-methylbutane, 1,2-epoxyhexane, 2,3-epoxyhexane, 3,4-epoxyhexane, 1,2-epoxydecane, 1,2-epoxydodecane, 1,2-epoxytetradecane, and/or 1,2-epoxyhexadecane. Examples of alkylaryl compounds carrying one epoxy group are optionally substituted (1,2-epoxyethylene)benzene (=styrene oxide) compounds.

In step b) the ratio of i) the alkylene oxide versus ii) the sum of the amount of the remaining hydroxy groups and optionally the remaining secondary amino groups is preferably 0.1:1 to 0.7:1 [mol/mol], more preferably 0.15:1 to 0.65:1 [mol/mol], most preferably 0.5:1 to 0.62:1 [mol/mol].

In another embodiment of the invention in step b) the ratio of
i) the alkylene oxide versus
ii) the sum of the amount of the remaining hydroxy groups and optionally the remaining secondary amino groups is 0.4:1 to 0.7:1 [mol/mol], more preferably 0.5:1 to 0.65:1 [mol/mol], most preferably 0.58:1 to 0.62:1 [mol/mol], and the alkylene oxide is butylene oxide.

In a further embodiment of the invention in step b) the ratio of i) the alkylene oxide versus ii) the sum of the amount of the remaining hydroxyl groups and optionally the remaining secondary amino groups is 0.1:1 to 0.7:1 [mol/mol], more preferably 0.15:1 to 0.25:1 [mol/mol], most preferably 0.18:1 to 0.22:1 [mol/mol], and the alkylene oxide is dodecene oxide.

In step b) the polymer preferably has a number average molecular weight in the range of from 500 to 100 000 g/mol.

The reaction of the condensation product obtained in step a) of the process according to the invention with the at least one alkylene oxide can be affected according to general alkoxylation procedures known in the art.

Preferably, in step b) the reaction of the remaining hydroxy groups and optionally of the remaining secondary amino groups with the at least one alkylene oxide is performed in the presence of a catalyst.

More preferably, step b) of the process according to the present invention is performed in the presence of a catalyst selected from a base, an acid and/or a Lewis acid.

Most preferably, step b) of the process according to the invention is performed in the presence of a catalyst which is a base (basic catalyst). Suitable bases are e.g. alkaline oxides, alkaline earth oxides, alkaline hydroxides, alkaline earth hydroxides, alkaline carbonates, alkaline earth carbonates, alkaline hydrogen carbonates, alkaline earth hydrogen carbonates as well as mixtures thereof. Preferred bases are alkaline hydroxides and alkaline earth hydroxides, such as NaOH, KOH or Ca(OH)$_2$.

The base is usually used in an amount of 5 to 30% by weight, based on the on the amount of remaining hydroxyl groups of the condensation product obtained in step a).

The degree of alkoxylation of the polymer resulting from step b) of the process according to the invention depends on the amount of the at least one alkylene oxide used.

The average degree of alkoxylation is preferably in the range from >0 to <1, more preferably in the range from 0.1 to 0.7, most preferably in the range from 0.15 to 0.65, and in particular in the range from 0.5 to 0.62.

Within the context of the present invention, the average degree of alkoxylation means the (average) number of alkylene oxide units attached to the remaining hydroxy groups and optionally the remaining secondary amino groups of the polyether (provided in step a)) due to the reaction of the polyether with the alkylene oxide in step b) of the present invention.

Usually, the reaction of step b) is carried out at elevated temperatures, preferably at temperatures from 40° C. to 250° C., more preferably from 80° C. to 200° C. and in particular from 100° C. to 150° C.

If more than one alkylene oxide is used in step b) of the process according to the invention the alkylenoxy units of the resulting polymer can be bound to each other in any order. Thus, statistical copolymers, graded copolymers, alternating copolymers or block copolymers can be obtained.

The polymer according to the invention preferably has a number average molecular weight in the range of 500 to 100 000 g/mol, more preferably in the range of 1000 to 80 000 g/mol, and in particular in the range of from 2 000 to 50 000 g/mol.

The polymer according to the invention preferably has a polydispersity (Mw/Mn) in the range of 1 to 10, and in particular in the range of 1 to 5.

Another aspect of the invention is a process for preparing the inventive polymer as described above, wherein the process comprises the steps a) and b):
a) condensation of at least one component a1), optionally at least one component a2) and/or optionally at least one component a3), which are defined as follows:

a1) is at least one compound selected from N-(hydroxyalkyl)amines of formulae (I.a) and/or (I.b),

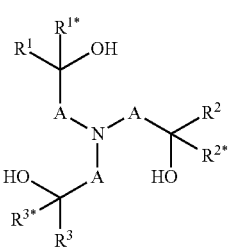

(I.a)

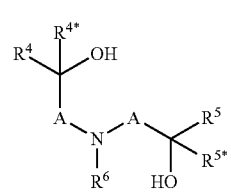

(I.b)

wherein
A are independently selected from $C_1$-$C_6$-alkylene,
$R^1$, $R^{1*}$, $R^2$, $R^{2*}$, $R^3$, $R^{3*}$, $R^4$, $R^{4*}$, $R^5$, $R^{5*}$ and $R^6$ are independently of one another selected from hydrogen, alkyl, cycloalkyl or aryl, wherein the last three mentioned radicals may be optionally substituted.

a2) is at least one compound selected from polyols of formula $Y(OH)_n$,
wherein
n is an integer from 2 to 4 and
Y denotes a bivalent, trivalent or tetravalent aliphatic, cycloaliphatic or aromatic radical having 2 to 10 carbon atoms.

a3) is at least one compound selected from polyamines of formula $Y'(NHR^y)_m$,
wherein
m is an integer from 2 to 4,
Y denotes a bivalent, trivalent or tetravalent aliphatic, cycloaliphatic or aromatic radical having 2 to 10 carbon atoms, and
$R^y$ has one of the meanings given for $R^6$ or two radicals $R^y$ together may form a $C_1$-$C_6$-alkylene group.

The sum of the amount of components a1), a2) and a3) is more than 70 wt.-% in relation to the sum of the amount of all monomers employed in the condensation according to step a) in order to obtain a polyether having remaining hydroxyl groups and optionally remaining secondary amino groups.

b) reacting a part of the remaining hydroxy groups and optionally a part of the remaining secondary amino groups of the polyetherobtained in step a) with at least one alkylene oxide, wherein the ratio of
i) the alkylene oxide versus
ii) the sum of the amount of the remaining hydroxyl groups and optionally the remaining secondary amino groups is >0:1 to <1:1 [mol/mol].

A further aspect of the invention relates to a derivative obtainable by quaternization, protonation, sulphation and/or phosphation of the polymers according to the present invention. Either the polymers obtained in step b) of the process according to the present invention can be subjected to derivatization or thus obtained derivatives can be subjected to a further derivatization. Concerning preferred polymers to be derivatized reference is made to the preferred embodiments mentioned above.

Thus, a further aspect of the invention relates to a process for preparing said derivatives comprising subjecting a polymer prepared by steps a) and b) of a process as outlined above in a (subsequent) step c) to quaternization, protonation, sulphation and/or phosphation.

Derivatives of the polymers according to the invention containing quaternary ammonium groups, i.e. charged cationic groups, can be produced from the amine nitrogen atoms by quaternization with alkylating agents. These include $C_1$-$C_4$-alkyl halides or sulphates, such as ethyl chloride, ethyl bromide, methyl chloride, methyl bromide, dimethyl sulphate and diethyl sulfate. A preferred quaternizing agent is dimethyl sulfate.

Derivatives of the polymers according to the invention containing charged cationic groups (different from quaternary ammonium groups) can also be produced from the amine nitrogen atoms by protonation with acids. Suitable acids are, for example, carboxylic acids, such as lactic acid, or mineral acids, such as phosphoric acid, sulfuric acid and hydrochloric acid.

The sulphation of the polymers according to the present invention can be effected by a reaction with sulphuric acid or with a sulphuric acid derivative. Thus, acidic alkyl ether sulphates are obtained.

Suitable sulphation agents are e.g. sulphuric acid (preferably 75 to 100% strength, more preferably 85 to 98% strength), oleum, $SO_3$, chlorosulphuric acid, sulphuryl chloride, amidosulphuric acid and the like. If sulphuryl chloride is being used as sulphation agent the remaining chlorine is being replaced by hydrolysis after sulphation.

The sulphation agent is frequently used in equimolar or amounts or in excess, e. g. 1 to 1.5 moles per mol of OH-group present in the polymer according to the invention. But, the sulphation agent can also be used in sub-equimolar amounts.

The sulphation can be effected in the presence of a solvent or entrainer. A suitable solvent or entrainer is e.g. toluene.

After sulphation the reaction mixture is generally neutralized and worked up in a conventional manner.

The phosphation of the polymers according to the present invention can be effected by a reaction with phosphoric acid or with a phosphoric acid derivative. Thus, acidic alkyl ether phosphates are obtained.

Phosphation of the polymers according to the present invention is generally carried out in analogous way to the sulphation described before. Suitable phosphation agents are e. g. phosphoric acid, polyphosphoric acid, phosphorous pentoxide, $POCl_3$ and the like. If $POCl_3$ is being used as sulphation agent the remaining chlorine is being replaced by hydrolysis after sulphation.

The polymer according to the present invention (as well as any derivative thereof) may be employed within a cleaning composition. The polymers according to the present invention can be added to the cleaning compositions in amounts of generally from 0.05 to 10% by weight, preferably from 0.1 to 5% by weight and more preferably from 0.15 to 2.5% by weight, based on the particular overall composition.

Cleaning compositions as such are known to a person skilled in the art. Such cleaning compositions may comprise one or more surfactants (surfactant system). Examples of cleaning compositions or components of such cleaning compositions, respectively, are as follows:

Surfactant

Surfactants may be desired herein as they contribute to the cleaning performance of the cleaning compositions of the present invention. Suitable surfactants are selected from the group consisting of a nonionic surfactant or a mixture thereof; an anionic surfactant or a mixture thereof; an amphoteric surfactant or a mixture thereof; a zwitterionic surfactant or a mixture thereof; a cationic surfactant or a mixture thereof; and mixtures thereof.

In the preferred embodiment wherein the composition is a hard surface cleaning composition, the composition comprises from about 1% to about 30%, preferably from about 3% to about 20%, and more preferably from about 5% to about 15% by weight of the total composition of a surfactant.

In the preferred embodiment wherein the composition is a hand dishwashing cleaning composition, the composition may comprise from about 5% to about 80%, preferably from about 10% to about 60%, more preferably from about 12% to about 45% by weight of the total composition of a surfactant. In preferred embodiments, the surfactant herein has an average branching of the alkyl chain(s) of more than about 10%, preferably more than about 20%, more preferably more than about 30%, and even more preferably more than about 40% by weight of the total surfactant.

Nonionic Surfactant

In one preferred embodiment, the cleaning composition comprises a nonionic surfactant. Suitable nonionic surfactants may be alkoxylated alcohol nonionic surfactants, which can be readily made by condensation processes which are well-known in the art. However, a great variety of such alkoxylated alcohols, especially ethoxylated and/or propoxylated alcohols, are commercially available. Surfactant catalogs are available which list a number of such surfactants, including nonionics.

Accordingly, preferred alkoxylated alcohols for use herein are nonionic surfactants according to the formula

$$R^1O(E)_e(P)_pH \quad \text{Formula (II)}$$

where $R^1$ is a hydrocarbon chain of from about 2 to about 24 carbon atoms, E is ethylene oxide, P is propylene oxide, and e and p which represent the average degree of, respectively ethoxylation and propoxylation, are of from about 0 to about 24 (with the sum of e+p being at least 1). Preferably, the hydrophobic moiety of the nonionic compound can be a primary or secondary, straight or branched alcohol having from about 8 to about 24 carbon atoms.

In some embodiments, preferred nonionic surfactants are the condensation products of ethylene oxide and/or propylene oxide with an alcohol having a straight or branched alkyl chain, having from about 6 to about 22 carbon atoms, preferably from about 9 to about 15 carbon atoms, wherein the degree of alkoxylation (ethoxylation and/or propoxylation) is from about 1 to about 25, preferably from about 2 to about 18, and more preferably from about 5 to about 12 moles of alkylene oxide per mole of alcohol. Particularly preferred are such surfactants containing from about 5 to about 12 moles of ethylene oxide per mole of alcohol. Such suitable nonionic surfactants are commercially available from Shell, for instance, under the trade name Neodol® or from BASF under the trade name Lutensol®.

Preferably, the nonionic surfactant is comprised in a typical amount of from about 2% to about 40%, preferably from about 3% to about 30% by weight of the liquid cleaning composition, and preferably from about 3 to about 20% by weight of the total composition.

Also suitable are alkylpolyglycosides having the formula

$$R^3O(C_nH_{2n}O)_t(\text{glycosyl})_z \quad \text{Formula (III)}$$

wherein $R^3$ of formula (III) is selected from the group consisting of an alkyl or a mixture thereof; an alkyl-phenyl or a mixture thereof; a hydroxyalkyl or a mixture thereof; a hydroxyalkylphenyl or a mixture thereof; and mixtures thereof, in which the alkyl group contains from about 10 to about 18, preferably from about 12 to about 14 carbon atoms; n of formula (III) is about 2 or about 3, preferably about 2; t of formula (III) is from about 0 to about 10, preferably about 0; and z of formula (III) is from about 1.3 to about 10, preferably from about 1.3 to about 3, most preferably from about 1.3 to about 2.7. The glycosyl is preferably derived from glucose. Also suitable are alkyl glycerol ether and sorbitan ester.

Also suitable is fatty acid amide surfactant having the formula (IV):

(IV)

wherein $R^6$ of formula (IV) is an alkyl group containing from about 7 to about 21, preferably from about 9 to about 17, carbon atoms, and each $R^7$ of formula (IV) is selected from the group consisting of hydrogen; a $C_1$-$C_4$ alkyl or a mixture thereof; a $C_1$-$C_4$ hydroxyalkyl or a mixture thereof; and a —$(C_2H_4O)_y$H or a mixture thereof, where y of formula (IV) varies from about 1 to about 3. Preferred amide can be a $C_8$-$C_{20}$ ammonia amide, a monoethanolamide, a diethanolamide, and an isopropanolamide.

Other preferred nonionic surfactants for use in the liquid cleaning composition may be the mixture of nonyl ($C_9$), decyl ($C_{10}$) undecyl ($C_{11}$) alcohols modified with, on average, about 5 ethylene oxide (EO) units such as the commercially available Neodol 91-5® or the Neodol 91-8® that is modified with on average about 8 EO units. Also suitable are the longer alkyl chains ethoxylated nonionics such as $C_{12}$ or $C_{13}$ modified with 5 EO (Neodol 23-5®). Neodol® is a Shell tradename. Also suitable is the $C_{12}$ or $C_{14}$ alkyl chain with 7 EO, commercially available under the trade name Novel 1412-7® (Sasol) or the Lutensol A 7 N® (BASF).

Preferred branched nonionic surfactants are the Guerbet $C_{10}$ alcohol ethoxylates with 5 EO such as Ethylan 1005, Lutensol XP 50® and the Guerbet $C_{10}$ alcohol alkoxylated nonionics (modified with EO and PO (propylene oxide)) such as the commercially available Lutensol XL® series (XI50, XL70, etc). Other branching also includes oxo branched nonionic surfactants such as the Lutensol ON 50® (5 EO) and Lutensol ON70® (7 EO). Other suitable branched nonionics are the ones derived from the isotridecyl alcohol and modified with ethylene oxide such as the Lutensol TO7® (7EO) from BASF and the Marlipal O 13/70® (7 EO) from Sasol. Also suitable are the ethoxylated fatty alcohols originating from the Fisher & Tropsch reaction comprising up to about 50% branching (about 40% methyl (mono or bi) about 10% cyclohexyl) such as those produced from the Safol® alcohols from Sasol; ethoxylated fatty alcohols originating from the oxo reaction wherein at least 50 wt % of the alcohol is $C_2$ isomer (methyl to pentyl) such as those produced from the Isalchem® alcohols or Lial® alcohols from Sasol; the ethoxylated fatty alcohols originating from the modified oxo reaction wherein at least about 15% by weight of the alcohol is $C_2$ isomer (methyl to pentyl) such as those produced from the Neodol® alcohols from Shell.

In one preferred embodiment, the weight ratio of total surfactant to nonionic surfactant is from about 2 to about 10, preferably from about 2 to about 7.5, more preferably from about 2 to about 6.

Anionic Surfactant

Anionic surfactants include, but are not limited to, those surface-active compounds that contain an organic hydrophobic group containing generally 8 to 22 carbon atoms or generally 8 to 18 carbon atoms in their molecular structure and at least one water-solubilizing group preferably selected from sulfonate, sulfate, and carboxylate so as to form a water-soluble compound. Usually, the hydrophobic group will comprise a C 8-C 22 alkyl, or acyl group. Such surfactants are employed in the form of water-soluble salts and the salt-forming cation usually is selected from sodium, potassium, ammonium, magnesium and mono-, di- or tri-C 2-C 3 alkanolammonium, with the sodium, cation being the usual one chosen.

Suitable anionic surfactants for use in the cleaning composition can be a sulfate, a sulfosuccinate, a sulfoacetate, and/or a sulphonate; preferably an alkyl sulfate and/or an alkyl ethoxy sulfate; more preferably a combination of an alkyl sulfate and/or an alkyl ethoxy sulfate with a combined ethoxylation degree less than about 5, preferably less than about 3, more preferably less than about 2.

Sulphate or sulphonate surfactant is typically present at a level of at least about 5%, preferably from about 5% to about 40%, and more preferably from about 15% to about 30%, and even more preferably at about 15% to about 25% by weight of the cleaning composition.

Suitable sulphate or sulphonate surfactants for use in the cleaning composition include water-soluble salts or acids of $C_8$-$C_{14}$ alkyl or hydroxyalkyl, sulphate or sulphonates. Suitable counterions include hydrogen, alkali metal cation or ammonium or substituted ammonium, but preferably sodium. Where the hydrocarbyl chain is branched, it preferably comprises a $C_{1-4}$ alkyl branching unit. The average percentage branching of the sulphate or sulphonate surfactant is preferably greater than about 30%, more preferably from about 35% to about 80%, and most preferably from about 40% to about 60% of the total hydrocarbyl chain. One particularly suitable linear alkyl sulphonate includes $C_8$ sulphonate like Witconate NAS 8® commercially available from Witco.

The sulphate or sulphonate surfactants may be selected from a $C_{11}$-$C_{18}$ alkyl benzene sulphonate (LAS), a $C_8$-$C_{20}$ primary, a branched-chain and random alkyl sulphate (AS); a $C_{10}$-$C_{18}$ secondary (2,3) alkyl sulphate; a $C_{10}$-$C_{18}$ alkyl alkoxy sulphate (AE$_x$S) wherein preferably x is from 1-30; a $C_{10}$-$C_{18}$ alkyl alkoxy carboxylate preferably comprising about 1-5 ethoxy units; a mid-chain branched alkyl sulphate as discussed in U.S. Pat. No. 6,020,303 and U.S. Pat. No. 6,060,443; a mid-chain branched alkyl alkoxy sulphate as discussed in U.S. Pat. No. 6,008,181 and U.S. Pat. No. 6,020,303; a modified alkylbenzene sulphonate (MLAS) as discussed in WO 99/05243, WO 99/05242, WO 99/05244, WO 99/05082, WO 99/05084, WO 99/05241, WO 99/07656, WO 00/23549, and WO 00/23548; a methyl ester sulphonate (MES); and an alpha-olefin sulphonate (AOS).

The paraffin sulphonate may be monosulphonate or disulphonate and usually are mixtures thereof, obtained by sulphonating a paraffin of about 10 to about 20 carbon atoms. Preferred sulphonates are those of $C_{12-18}$ carbon atoms chains and more preferably they are $C_{14-17}$ chains. Paraffin sulphonates that have the sulphonate group(s) distributed along the paraffin chain are described in U.S. Pat. No. 2,503,280; U.S. Pat. No. 2,507,088; U.S. Pat. No. 3,260,744; and U.S. Pat. No. 3,372,188.

Also suitable are the alkyl glyceryl sulphonate surfactant and/or alkyl glyceryl sulphate surfactant described in the Procter & Gamble patent application WO06/014740: A mixture of oligomeric alkyl glyceryl sulphonate and/or sulfate surfactant selected from a dimmer or a mixture thereof; a trimer or a mixture thereof; a tetramer or a mixture thereof; a pentamer or a mixture thereof; a hexamer or a mixture thereof; a heptamer or a mixture thereof; and mixtures thereof; wherein the alkyl glyceryl sulphonate and/or sulfate surfactant mixture comprises from about 0% to about 60% by weight of the monomers.

Other suitable anionic surfactants are alkyl, preferably dialkyl sulfosuccinate and/or sulfoacetate. The dialkyl sulfosuccinate may be a $C_{6-15}$ linear or branched dialkyl sulfosuccinate. The alkyl moiety may be symmetrical (i.e., the same alkyl moieties) or asymmetrical (i.e., different alkyl moieties). Preferably, the alkyl moiety is symmetrical.

Most common branched anionic alkyl ether sulphates are obtained via sulfation of a mixture of the branched alcohols and the branched alcohol ethoxylates. Also suitable are the sulfated fatty alcohols originating from the Fischer & Tropsh reaction comprising up to about 50% branching (about 40% methyl (mono or bi) about 10% cyclohexyl) such as those produced from the safol alcohols from Sasol; sulfated fatty alcohols originating from the oxo reaction wherein at least about 50% by weight of the alcohol is $C_2$ isomer (methyl to pentyl) such as those produced from the Isalchem® alcohols or Lial® alcohols from Sasol; the sulfated fatty alcohols originating from the modified oxo reaction wherein at least about 15% by weight of the alcohol is $C_2$ isomer (methyl to pentyl) such as those produced from the Neodol® alcohols from Shell.

Zwitterionic Surfactant and Amphoteric Surfactant

The zwitterionic and amphoteric surfactants for use in the cleaning composition can be comprised at a level of from about 0.01% to about 20%, preferably from about 0.2% to about 15%, more preferably from about 0.5% to about 10% by weight of the cleaning composition.

Suitable zwitterionic surfactant in the preferred embodiment wherein contains both basic and acidic groups which form an inner salt giving both cationic and anionic hydrophilic groups on the same molecule at a relatively wide range of pH's. The typical cationic group is a quaternary ammonium group, although other positively charged groups like phosphonium, imidazolium and sulfonium groups can be used. The typical anionic hydrophilic groups are carboxylate and sulphonate, although other groups like sulfate, phosphonate, and the like can be used.

The cleaning compositions may preferably further comprise an amine oxide and/or a betaine. Most preferred amine oxides are coconut dimethyl amine oxide or coconut amido propyl dimethyl amine oxide. Amine oxide may have a linear or mid-branched alkyl moiety. Typical linear amine oxides include water-soluble amine oxide containing one $R^4$ $C_{8-18}$ alkyl moiety and 2 $R^5$ and $R^8$ moieties selected from the group consisting of a $C_{1-3}$ alkyl group and a mixtures thereof; and a $C_{1-3}$ hydroxyalkyl group and a mixture thereof. Preferably amine oxide is characterized by the formula $R^4$—N($R^5$)($R^8$)→O wherein $R^4$ is a $C_{8-18}$ alkyl and $R^5$ and $R^8$ are selected from the group consisting of a methyl; an ethyl; a propyl; an isopropyl; a 2-hydroxyethyl; a 2-hydroxypropyl; and a 3-hydroxypropyl. The linear amine oxide surfactant, in particular, may include a linear $C_{10}$-$C_{18}$ alkyl dimethyl amine oxide and a linear $C_8$-$C_{12}$ alkoxy ethyl dihydroxy ethyl amine oxide. Preferred amine oxides include linear $C_{10}$, linear $C_{10}$-$C_{12}$, and linear $C_{12}$-$C_{14}$ alkyl dimethyl amine oxides.

As used herein "mid-branched" means that the amine oxide has one alkyl moiety having $n_1$ carbon atoms with one alkyl branch on the alkyl moiety having $n_2$ carbon atoms. The alkyl branch is located on the α carbon from the nitrogen on the alkyl moiety. This type of branching for the amine oxide is also known in the art as an internal amine oxide. The total sum of $n_1$ and $n_2$ is from about 10 to about 24 carbon atoms, preferably from about 12 to about 20, and more preferably from about 10 to about 16. The number of carbon atoms for the one alkyl moiety ($n_1$) should be approximately the same number of carbon atoms as the one alkyl branch ($n_2$) such that the one alkyl moiety and the one alkyl branch are symmetric. As used herein, "symmetric" means that $|n_1-n_2|$ is less than or equal to about 5, preferably about 4, most preferably from about 0 to about 4 carbon atoms in at least about 50 wt %, more preferably at least about 75 wt % to about 100 wt % of the mid-branched amine oxide for use herein.

The amine oxide further comprises two moieties, independently selected from a $C_{1-3}$ alkyl; a $C_{1-3}$ hydroxyalkyl group; or a polyethylene oxide group containing an average of from about 1 to about 3 ethylene oxide groups. Preferably the two moieties are selected from a $C_{1-3}$ alkyl, more preferably both are selected as a $C_1$ alkyl.

Other suitable surfactants include a betaine such an alkyl betaine, an alkylamidobetaine, an amidazoliniumbetaine, a sulfobetaine (INCI Sultaines), as well as a phosphobetaine, and preferably meets formula V:

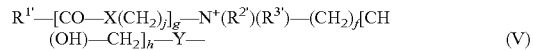

$$R^{1'}—[CO—X(CH_2)_j]_g—N^+(R^{2'})(R^{3'})—(CH_2)_f[CH(OH)—CH_2]_h—Y— \quad (V)$$

wherein $R^{1'}$ is a saturated or unsaturated $C_{6-22}$ alkyl residue, preferably a $C_{8-18}$ alkyl residue, in particular a saturated $C_{10-16}$ alkyl residue, for example a saturated $C_{12-14}$ alkyl residue;

X is NH, $NR^{4'}$ with $C_{1-4}$ alkyl residue $R^{4'}$, O or S, j is a number from about 1 to about 10, preferably from about 2 to about 5, in particular about 3, g is about 0 or about 1, preferably about 1, $R^{2'}$, $R^{3'}$ are independently a $C_{1-4}$ alkyl residue, potentially hydroxy substituted by such as a hydroxyethyl, preferably by a methyl.

f is a number from about 1 to about 4, in particular about 1, 2 or 3, h is about 0 or 1, and Y is selected from COO, $SO_3$, $OPO(OR^{5'})O$ or $P(O)(OR^{5'})O$, whereby $R^{5'}$ is a hydrogen atom H or a $C_{1-4}$ alkyl residue.

Preferred betaines are the alkyl betaine of the formula ($V_a$), the alkyl amido betaine of the formula ($V_b$), the sulfo betaine of the formula ($V_c$), and the Amido sulfobetaine of the formula ($V_d$);

$$R^{1'}—N^+(CH_3)_2—CH_2COO^- \quad (V_a)$$

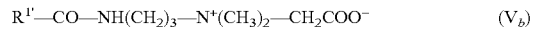

$$R^{1'}—CO—NH(CH_2)_3—N^+(CH_3)_2—CH_2COO^- \quad (V_b)$$

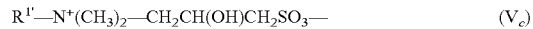

$$R^{1'}—N^+(CH_3)_2—CH_2CH(OH)CH_2SO_3^- \quad (V_c)$$

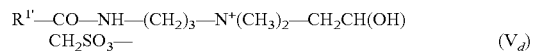

$$R^{1'}—CO—NH—(CH_2)_3—N^+(CH_3)_2—CH_2CH(OH)CH_2SO_3^- \quad (V_d)$$

in which $R^{1'}$ has the same meaning as in formula V. Particularly preferred betaines are the carbobetaine, wherein $Y^-$ is [COO$^-$], in particular the carbobetaine of formula ($V_a$) and ($V_b$), more preferred are the alkylamidobetaine of the formula ($V_b$).

Examples of suitable betaines and sulfobetaines are the following (designated in accordance with INCI): almondamidopropyl of betaine, apricotamidopropyl betaine, avocadamidopropyl of betaine, babassuamidopropyl of betaine, behenamidopropyl betaine, behenyl of betaine, betaine, canolamidopropyl betaine, capryl/capramidopropyl betaine, carnitine, cetyl of betaine, cocamidoethyl of betaine, cocamidopropyl betaine, cocamidopropyl hydroxysultaine, coco betaine, coco hydroxysultaine, coco/oleamidopropyl betaine, coco sultaine, decyl of betaine, dihydroxyethyl oleyl glycinate, dihydroxyethyl soy glycinate, dihydroxyethyl stearyl glycinate, dihydroxyethyl tallow glycinate, dimethicone propyl of PG-betaine, drucamidopropyl hydroxysultaine, hydrogenated tallow of betaine, isostearamidopropyl betaine, lauramidopropyl betaine, lauryl of betaine, lauryl hydroxysultaine, lauryl sultaine, milk amidopropyl betaine, milkamidopropyl of betaine, myristamidopropyl betaine, myristyl of betaine, oleamidopropyl betaine, oleamidopropyl hydroxysultaine, oleyl of betaine, olivamidopropyl of betaine, palmamidopropyl betaine, palmitamidopropyl betaine, palmitoyl carnitine, palm kernel amidopropyl betaine, polytetrafluoroethylene acetoxypropyl of betaine, ricinoleamidopropyl betaine, sesamidopropyl betaine, soyamidopropyl betaine, stearamidopropyl betaine, stearyl of betaine, tallowamidopropyl betaine, tallowamidopropyl hydroxysultaine, tallow of betaine, tallow dihydroxyethyl of betaine, undecylenamidopropyl betaine and wheat germ amidopropyl betaine. Preferred betaine is for example cocoamidopropyl betaine.

For example coconut dimethyl betaine is commercially available from Seppic under the trade name of Amonyl 265®. Lauryl betaine is commercially available from Albright & Wilson under the trade name Empigen BB/L®. A further example of betaine is lauryl-imino-dipropionate commercially available from Rhodia under the trade name Mirataine H2C-HA®.

One particularly preferred zwitterionic surfactants for use in the preferred embodiment wherein the composition is a hard surface cleaning composition is the sulfobetaine surfactant, because it delivers optimum soap scum cleaning benefits.

Examples of particularly suitable sulfobetaine surfactants include tallow bis(hydroxyethyl) sulphobetaine and cocoamido propyl hydroxy sulphobetaine which are commercially available from Rhodia and Witco, under the trade name of Mirataine CBS® and Rewoteric AM CAS 15® respectively.

Cationic Surfactant

In one preferred embodiment, the cleaning composition can comprise a cationic surfactant present in an effective amount, more preferably from about 0.1% to about 20%, by weight of the liquid cleaning composition. Suitable cationic surfactant is quaternary ammonium surfactant. Suitable quaternary ammonium surfactant is selected from the group consisting of a mono $C_6$-$C_{16}$, preferably a $C_6$-$C_{10}$ N-alkyl or an alkenyl ammonium surfactant or a mixture thereof, wherein the remaining N positions are substituted by a methyl, a hydroxyethyl or a hydroxypropyl group. Another preferred cationic surfactant is a $C_6$-$C_{18}$ alkyl or alkenyl ester of a quaternary ammonium alcohol, such as quaternary chlorine ester. More preferably, the cationic surfactant has formula (VI):

Formula VI

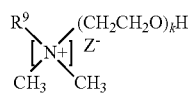

wherein $R^9$ of formula (V) is a $C_8$-$C_{18}$ hydrocarbyl or a mixture thereof, preferably, a $C_{8-14}$ alkyl, more preferably, a $C_8$, $C_{10}$ or $C_{12}$ alkyl; and Z of formula (V) is an anion, preferably, a chloride or a bromide.

Optional Ingredients

The cleaning composition according to the present invention may comprise a variety of optional ingredients depending on the technical benefit aimed for and the surfaces treated.

Suitable optional ingredients for use herein include an alkaline material or a mixture thereof; an inorganic or organic acid and salt thereof or a mixture thereof; a buffering agent or a mixture thereof; a surface modifying polymer or a mixture thereof; a cleaning polymer or a mixture thereof; a peroxygen bleach or a mixture thereof; a radical scavenger or a mixture thereof; a chelating agent or a mixture thereof; a perfume or a mixture thereof; a dye or a mixture thereof; a hydrotrope or a mixture thereof; a polymeric suds stabilizer or a mixture thereof; a diamine or a mixture thereof; and mixtures thereof.

Solvent

Solvents are generally used to ensure preferred product quality for dissolution, thickness and aesthetics and to ensure better processing. The cleaning composition of the present invention may further comprise a solvent or a mixture thereof, as an optional ingredient. Typically, in the preferred embodiment wherein the composition is a hard surface cleaning composition, the composition may comprise from about 0.1% to about 10%, preferably from about 0.5% to about 5%, and more preferably from about 1% to about 3% by weight of the total composition of a solvent or a mixture thereof. In the preferred embodiment wherein the composition is a hand dishwashing detergent composition, the composition contains from about 0.01% to about 20%, preferably from about 0.5% to about 20%, more preferably from about 1% to about 10% by weight of a solvent.

Suitable solvents herein include $C_1$-$C_5$ alcohols according to the formula $R^{10}$—OH wherein $R^{10}$ is a saturated alkyl group of from about 1 to about 5 carbon atoms, preferably from about 2 to about 4. Suitable alcohols are ethanol, propanol, isopropanol or mixtures thereof. Other suitable alcohols are alkoxylated $C_{1-8}$ alcohols according to the formula $R^{11}$-$(A_q)$—OH wherein $R^{11}$ is a alkyl group of from about 1 to about 8 carbon atoms, preferably from about 3 to about 6, and wherein A is an alkoxy group, preferably propoxy and/or ethoxy, and q is an integer of from 1 to 5, preferably from 1 to 2. Suitable alcohols are butoxy propanol (n-BPP), butoxy propanol (n-BP), butoxyethanol, or mixtures thereof. Suitable alkoxylated aromatic alcohols to be used herein are those according to the formula $R^{12}$—$(B)_r$—OH wherein $R^{12}$ is an alkyl substituted or non-alkyl substituted aryl group of from about 1 to about 20 carbon atoms, preferably from about 2 to about 15, and more preferably from about 2 to about 10, wherein B is an alkoxy group, preferably a butoxy, propoxy and/or ethoxy, and r is an integer of from 1 to 5, preferably from 1 to 2. A suitable aromatic alcohol to be used herein is benzyl alcohol. Suitable alkoxylated aromatic alcohol is benzylethanol and or benzylpropanol. Other suitable solvent includes butyl diglycolether, benzylalcohol, propoxypropoxypropanol (EP 0 859 044) ether and diether, glycol, alkoxylated glycol, $C_6$-$C_{16}$ glycol ether, alkoxylated aromatic alcohol, aromatic alcohol, aliphatic branched alcohol, alkoxylated aliphatic branched alcohol, alkoxylated linear $C_1$-$C_5$ alcohol, linear $C_1$-$C_5$ alcohol, amine, $C_8$-$C_{14}$ alkyl and cycloalkyl hydrocarbon and halohydrocarbon, and mixtures thereof.

Perfume

The cleaning composition of the present invention may comprise a perfume ingredient, or mixtures thereof, in amount up to about 5.0% by weight of the total composition, preferably in amount of about 0.1% to about 1.5%. Suitable perfume compounds and compositions for use herein are for example those described in EP-A-0 957 156 under the paragraph entitled "Perfume", on page 13.

Dye

The cleaning composition according to the present invention may be colored. Accordingly, it may comprise a dye or a mixture thereof. Suitable dyes for use herein are chemically and physically stable at the pH of the composition herein.

pH Adjustment Agent

Alkaline Material

Preferably, an alkaline material may be present to trim the pH and/or maintain the pH of the composition according to the present invention. The amount of alkaline material is from about 0.001% to about 20%, preferably from about 0.01% to about 10%, and more preferably from about 0.05% to about 3% by weight of the composition.

Examples of the alkaline material are sodium hydroxide, potassium hydroxide and/or lithium hydroxide, and/or the alkali metal oxide, such as sodium and/or potassium oxide, or mixtures thereof. Preferably, the source of alkalinity is sodium hydroxide or potassium hydroxide, preferably sodium hydroxide.

Acid

The cleaning composition of the present invention may comprise an acid. Any acid known to those skilled in the art may be used herein. Typically the composition herein may comprise up to about 20%, preferably from about 0.1% to about 10%, more preferably from about 0.1% to about 5%, even more preferably from about 0.1% to about 3%, by weight of the total composition of an acid.

Suitable acids are selected from the group consisting of a mono- and poly-carboxylic acid or a mixture thereof; a percarboxylic acid or a mixture thereof; a substituted carboxylic acid or a mixture thereof; and mixtures thereof. Carboxylic acids useful herein include $C_{1-6}$ linear or at least about 3 carbon containing cyclic acids. The linear or cyclic carbon-containing chain of the carboxylic acid may be substituted with a substituent group selected from the group consisting of hydroxyl, ester, ether, aliphatic groups having from about 1 to about 6, more preferably from about 1 to about 4 carbon atoms, and mixtures thereof.

Suitable mono- and poly-carboxylic acids are selected from the group consisting of citric acid, lactic acid, ascorbic acid, isoascorbic acid, tartaric acid, formic acid, maleic acid, malic acid, malonic acid, propionic acid, acetic acid, dehydroacetic acid, benzoic acid, hydroxy benzoic acid, and mixtures thereof.

Suitable percarboxylic acids are selected from the group consisting of peracetic acid, percarbonic acid, perboric acid, and mixtures thereof.

Suitable substituted carboxylic acids are selected from the group consisting of an amino acid or a mixture thereof; a halogenated carboxylic acid or a mixture thereof; and mixtures thereof.

Preferred acids for use herein are selected from the group consisting of lactic acid, citric acid, and ascorbic acid and mixtures thereof. More preferred acids for use herein are selected from the group consisting of lactic acid and citric acid and mixtures thereof. An even more preferred acid for use herein is lactic acid.

Suitable acids are commercially available from JBL, T&L, or Sigma. Lactic acid is commercially available from Sigma and Purac.

Salt

In a preferred embodiment, the cleaning composition of the present invention also comprises other salts as the pH buffer. Salts are generally present at an active level of from about 0.01% to about 5%, preferably from about 0.015% to about 3%, more preferably from about 0.025% to about 2.0%, by weight of the composition.

When salts are included, the ions can be selected from magnesium, sodium, potassium, calcium, and/or magnesium, and preferably from sodium and magnesium, and are added as a hydroxide, chloride, acetate, sulphate, formate, oxide or nitrate salt to the composition of the present invention.

Chelant

In a preferred embodiment, the composition of the present invention may comprise a chelant at a level of from about 0.1% to about 20%, preferably from about 0.2% to about 5%, more preferably from about 0.2% to about 3% by weight of total composition.

Suitable chelants can be selected from the group consisting of an amino carboxylate or a mixture thereof; an amino phosphonate or a mixture thereof; a polyfunctionally-substituted aromatic chelant or a mixture thereof; and mixtures thereof.

Preferred chelants for use herein are the amino acid based chelants, and preferably glutamic-N,N-diacetic acid (GLDA) and derivatives, and/or phosphonate based chelants, and preferably diethylenetriamine pentamethylphosphonic acid. GLDA (salts and derivatives thereof) is especially preferred according to the invention, with the tetrasodium salt thereof being especially preferred.

Also preferred are amino carboxylates including ethylenediaminetetra-acetate, N-hydroxyethylethylenediaminetriacetate, nitrilo-triacetate, ethylenediamine tetrapro-prionate, triethylenetetraaminehexacetate, diethylenetriaminepentaacetate, ethanoldi-glycine; and alkali metal, ammonium, and substituted ammonium salts thereof; and mixtures thereof; as well as MGDA (methyl-glycine-diacetic acid), and salts and derivatives thereof;

Other chelants include homopolymers and copolymers of polycarboxylic acids and their partially or completely neutralized salts, monomeric polycarboxylic acids and hydroxycarboxylic acids and their salts. Preferred salts of the above-mentioned compounds are the ammonium and/or alkali metal salts, i.e. the lithium, sodium, and potassium salts, and particularly preferred salts are the sodium salts.

Suitable polycarboxylic acids are acyclic, alicyclic, heterocyclic and aromatic carboxylic acids, in which case they contain at least about two carboxyl groups which are in each case separated from one another by, preferably, no more than about two carbon atoms. Polycarboxylates which comprise two carboxyl groups include, for example, water-soluble salts of, malonic acid, (ethyl enedioxy) diacetic acid, maleic acid, diglycolic acid, tartaric acid, tartronic acid and fumaric acid. Polycarboxylates which contain three carboxyl groups include, for example, water-soluble citrate. Correspondingly, a suitable hydroxycarboxylic acid is, for example, citric acid. Another suitable polycarboxylic acid is the homopolymer of acrylic acid. Preferred are the polycarboxylates end capped with sulphonates.

Further suitable polycarboxylates chelants for use herein include acetic acid, succinic acid, formic acid; all preferably in the form of a water-soluble salt. Other suitable polycarboxylates are oxodisuccinates, carboxymethyloxysuccinate and mixtures of tartrate monosuccinic and tartrate disuccinic acid such as described in U.S. Pat. No. 4,663,071.

Amino phosphonates are also suitable for use as chelant and include ethylenediaminetetrakis (methylenephosphonates) as DEQUEST. Preferably, these amino phosphonates do not contain alkyl or alkenyl groups with more than about 6 carbon atoms.

Polyfunctionally-substituted aromatic chelants are also useful in the composition herein, such as described in U.S. Pat. No. 3,812,044. Preferred compounds of this type in acid form are dihydroxydisulfobenzenes such as 1,2-dihydroxy-3,5-disulfobenzene.

Hydrotrope

The cleaning composition of the present invention may optionally comprise a hydrotrope in an effective amount so that the composition is appropriately compatible in water. The composition of the present invention typically comprises from about 0% to about 15% by weight of the total composition of a hydrotropic, or mixtures thereof, preferably from about 1% to about 10%, most preferably from about 3% to about 6%. Suitable hydrotropes for use herein include anionic-type hydrotropes, particularly sodium, potassium, and ammonium xylene sulphonate, sodium, potassium and ammonium toluene sulphonate, sodium potassium and ammonium cumene sulphonate, and mixtures thereof, and related compounds, as disclosed in U.S. Pat. No. 3,915,903.

The following examples shall further illustrate the present invention without restricting the scope of this invention.

I. ANALYTICAL METHODS

The Amine number was determined according to DIN 16945-5.6 (1989) by titration of a solution of the polymer in acetic acid with perchloric acid.

The Hydroxy number was determined according to DIN 53240-1 (2013) by heating the sample in pyridine with acetic acid anhydride and acetic acid, followed by titration with potassium hydroxide.

The Molecular weight (Mn) was determined by size exclusion chromatography with hexafluoroisopropanol as eluent.

The viscosity of the pure polymers was measured with a rotary viscometer (Haake) at 20° C.

II. PREPARATION EXAMPLES

In the following examples, "/mol OH" means per mol of free OH-groups in the polymer (polytriethanolamine in the following examples).

Example 1: Polytriethanolamine+0.3 Mol Butylene Oxide/Mol OH 1 a) Polytriethanolamine (Condensation According to Step a))

A four-neck flask equipped with stirrer, distillation bridge, gas inlet tube, and internal thermometer is charged with 1500 g triethanolamine and 20 g of a 50% by weight aqueous solution of $H_3PO_2$. The mixture is heated under nitrogen to 200° C. The reaction mixture is stirred at 200° C. over a period of 15.5 hours, during which the condensate formed in the reaction is removed by means of a moderate stream of $N_2$ as stripping gas via the distillation bridge. Toward the end of the reaction time indicated, the temperature is lowered to 140° C. Residual low molecular weight products are removed under a pressure of 100 mbar. Then, the reaction mixture is cooled to ambient temperature, and polytriethanolamine (OH number: 585 mg KOH/g, amine number: 423 mg KOH/g, dynamic viscosity at 60° C.: 431 mPas, Mn=4450 g/mol, Mw=8200 g/mol) is obtained.

1 b) Reaction with 0.3 Mol Butylene Oxide/Mol OH (Alkoxylation According to Step b))

In a 1 l autoclave 206.3 g polytriethanolamine obtained in example 1 a) and 1.0 g potassium hydroxide (50% aqueous solution) are mixed and stirred under vacuum (<10 mbar) at 120° C. for 2 h. The autoclave is purged with nitrogen and heated to 140° C. 46.5 g butylene oxide is added within 0.5 h. To complete the reaction, the mixture is allowed to post-react for additional 10 h at 140° C. The reaction mixture is stripped with nitrogen and volatile compounds are removed in vacuo at 80° C. 252.0 g of a brown liquid is obtained (hydroxyl number: 495.6 mgKOH/g, amine number: 357.9 mgKOH/g).

Example 2: Polytriethanolamine+0.6 Mol Butylene Oxide/Mol OH

In a 1 l autoclave 153.6 g polytriethanolamine obtained in example 1 a) and 0.9 g potassium hydroxide (50% aqueous solution) are mixed and stirred under vacuum (<10 mbar) at 120° C. for 2 h. The autoclave is purged with nitrogen and heated to 140° C. 69.2 g butylene oxide is added within 1 h. To complete the reaction, the mixture is allowed to post-react for additional 10 h at 140° C. The reaction mixture is stripped with nitrogen and volatile compounds are removed in vacuo at 80° C. 223.0 g of a brown liquid is obtained (hydroxyl number: 444.9 mgKOH/g, amine number: 304.1 mgKOH/g).

Example 3: Polytriethanolamine+0.5 Mol Dodecene Oxide/Mol OH

In a 2 l autoclave 197.8 g polytriethanolamine obtained in example 1 a) and 0.8 g potassium hydroxide (50% aqueous solution) are mixed and stirred under vacuum (<10 mbar) at 120° C. for 2 h. The autoclave is purged with nitrogen and heated to 140° C. 189.6 g dodecene oxide is added within 2 h. To complete the reaction, the mixture is allowed to post-react for additional 20 h at 140° C. The reaction mixture is stripped with nitrogen and volatile compounds are removed in vacuo at 80° C. 390.0 g of a brown liquid is obtained.

Example 4: Polytriethanolamine+0.3 Mol Dodecene Oxide/Mol OH

In a 2 l autoclave 197.8 g polytriethanolamine obtained in example 1 a) and 0.6 g potassium hydroxide (50% aqueous solution) are mixed and stirred under vacuum (<10 mbar) at 120° C. for 2 h. The autoclave is purged with nitrogen and heated to 140° C. 113.7 g dodecene oxide is added within 1 h. To complete the reaction, the mixture is allowed to post-react for additional 20 h at 140° C. The reaction mixture is stripped with nitrogen and volatile compounds are removed in vacuo at 80° C. 299.0 g of a brown liquid is obtained (hydroxyl number: 411.3 mgKOH/g amine number: 277.2 mgKOH/g).

Example 5: Polytriethanolamine+0.2 Mol Dodecene Oxide/Mol OH

In a 2 l autoclave 229.5 g polytriethanolamine obtained in example 1 a) and 0.6 g potassium hydroxide (50% aqueous solution) are mixed and stirred under vacuum (<10 mbar) at 120° C. for 2 h. The autoclave is purged with nitrogen and heated to 140° C. 88.1 g dodecene oxide is added within 0.5 h. To complete the reaction, the mixture is allowed to post-react for additional 24 h at 140° C. The reaction mixture is stripped with nitrogen and volatile compounds are removed in vacuo at 80° C. 315.0 g of a brown liquid is obtained (hydroxyl number: 426.5 mgKOH/g)

Example 6: Polytriethanolamine+0.1 Mol Dodecene Oxide/Mol OH

In a 2 l autoclave 242.2 g polytriethanolamine obtained in example 1 a) and 0.6 g potassium hydroxide (50% aqueous solution) are mixed and stirred under vacuum (<10 mbar) at 120° C. for 2 h. The autoclave is purged with nitrogen and heated to 140° C. 46.5 g dodecene oxide is added within 0.5 h. To complete the reaction, the mixture is allowed to post-react for additional 24 h at 140° C. The reaction mixture is stripped with nitrogen and volatile compounds are removed in vacuo at 80° C. 287.9 g of a brown liquid is obtained.

Comparative Example 7: Polytriethanolamine+20 Mol Ethylene Oxide/Mol OH

In a 2 l autoclave 66.0 g polytriethanolamine obtained in example 1 a) and 2.7 g potassium hydroxide (50% aqueous solution) are mixed and stirred under vacuum (<10 mbar) at 120° C. for 2 h. The autoclave is purged with nitrogen and heated to 140° C. 605.6 g ethylene oxide is added within 6 h. To complete the reaction, the mixture is allowed to post-react for additional 10 h at 140° C. The reaction mixture is stripped with nitrogen and volatile compounds are removed in vacuo at 80° C. 653.6 g of a light brown solid is obtained (hydroxyl number: 65,4 mgKOH/g)

Example 8: Polytriethanolamine+0.2 Mol Dodecene Oxide/Mol OH

In a 2 l autoclave 167.1 g polytriethanolamine (hydroxyl number: 448.1 mgKOH/g) obtained as described in example 1 a) and 0.4 g potassium tert. butoxide are mixed and stirred under vacuum (<10 mbar) at 120° C. for 0.5 h. The autoclave is purged with nitrogen and heated to 140° C. 49.1 g dodecene oxide is added within 0.5 h. To complete the reaction, the mixture is allowed to post-react for additional 20 h at 140° C. The reaction mixture is stripped with nitrogen and volatile compounds are removed in vacuo at 80° C. 216.6 g of a brown liquid is obtained.

Comparative Example 9: Polytriethanolamine+1.5 Mol Dodecene Oxide/Mol OH

In a 5 l autoclave 400.0 g polytriethanolamine (hydroxyl number: 584.6 mgKOH/g) obtained as described in example 1 a) and 7.8 g potassium tert. butoxide are mixed and stirred under vacuum (<10 mbar) at 120° C. for 0.5 h. The autoclave is purged with nitrogen and heated to 140° C. 1150.0 g dodecene oxide is added within 6 h. To complete the reaction, the mixture is allowed to post-react for additional 80 h at 140° C. The reaction mixture is stripped with nitrogen and volatile compounds are removed in vacuo at 80° C. 1558.0 g of a yellow liquid is obtained. The conversion of dodecene epoxide (99%) is determined by epoxide titration: epoxy value 113.3 mgKOH/g, amine number: 110.5 mgKOH/g. Epoxy value is determined:according to DIN1877 (July 2000)

Example 10: Evaluation of Cleaning Performance

Preparation of Burnt-on Grease:
Commercially available vegetable oils are mixed together with albumin (commercially available from Sigma Aldrich) in a ratio of 80 to 20 (w/w) and a heat resistant red dye is added. The mixture is homogenously distributed on an enamel plate and the plate is baked at 165° C. for 2.5-3 hours.

Test Procedure:
The prepared enamel plates are placed into a wet abrasion scrub tester (Sheen Instruments). Four Sponges are placed into the scrub tester and are treated with 25 mL of a test solution of 10% w/w of a detergent composition as detailed below in table 1 together with 90% w/w water. Hardness of the test solutions is adjusted to 2.5 mM of $Ca^{2+}/Mg^{2+}$ (ratio 3:1) and the pH to 9.0. A photo is taken after every wipe. The amount of residual grease on the enamel plate is quantified via image analysis of the photo.

The following hand dishwashing detergent compositions are made (table 1):

TABLE 1

| Ingredients | Reference composition A | Composition B |
|---|---|---|
| AES | 21.41 | 21.41 |
| C12/14 dimethyl amineoxide | 4.86 | 4.86 |
| Nonionic surfactant | 0.43 | 0.43 |
| PPG 2000 | 0.40 | 0.40 |
| Ethanol | 2.36 | 2.36 |
| NaCl | 0.80 | 0.80 |
| Phenoxyethanol | 0.15 | 0.15 |
| PEI polymer | 0.25 | 0.25 |
| Additive | — | 5.0 |

Dye, perfume and preservative
NaOH/HCl to pH 9 (10% in demin water)
Water to 100%
Numbers in weight % of the formula AES: C13-15 ethoxylated sulfate with 0.6 average ethoxylation. Nonionic surfactant is a C9-C11 E08.
PPG 2000: polypropylene glycol (Molecular Weight 2000)
PEI polymer: alkoxylated polyethyleneimine polymer with a number average molecularweight of about 14,000 g/mol Cleaning performance for solutions with additive (composition B as defined in table 1) are reported after 10 wipes in percentage vs. the cleaning observed for the solution without additive (reference composition A as defined in table 1). The results are shown in tables 2 and 3. Only results within the same cleaning test are compared.

TABLE 2

(cleaning test 1):

| Additive according to table 1 | cleaning index/[% vs. Reference composition A] after 10 wipes |
|---|---|
| example 1b) | 172 |
| example 2 | 162 |
| comparitive example 7 | 92 |

TABLE 3

(cleaning test 2):

| Additive | cleaning index/[% vs. reference] after 10 wipes |
|---|---|
| example 5 | 182 |
| example 4 | 184 |
| comparitive example 7 | 114 |

TABLE 4

(cleaning test 4):

| Additive according to table 1 | cleaning index/[% vs. Reference composition A] after 10 wipes |
|---|---|
| example 5 | 207 |
| comparitive example 9 | 99 |

Use of comparative example 9 as additive resulted in a turbid test solution whereas for example 5 a clear solution was obtained.

The results, as presented in table 2, 3 and 4 prove the performance of dishwashing compositions comprising an additive according to example 1 to 6 and 8 according to the present invention in a cleaning test to be superior over dishwashing compositions without an additive (composition A). Further, dishwashing compositions containing an polymer as additive, not according to the invention (comparative examples 7 and 9 in table 2, 3 and 4 show inferior results in the same test. This demonstrates the properties of the selected chemical structure of the inventive polymer, if used as additive, to be causal for the observed improved cleaning performance of the dishwashing composition.

The invention claimed is:

1. A polymer obtained by a process comprising steps a) and b):
a) condensing at least one component a1), optionally at least one component a2), and/or optionally at least one component a3), which are defined as follows:
a1) is at least one compound selected from N-(hydroxyalkyl)amines of formulae (I.a) and/or (I.b),

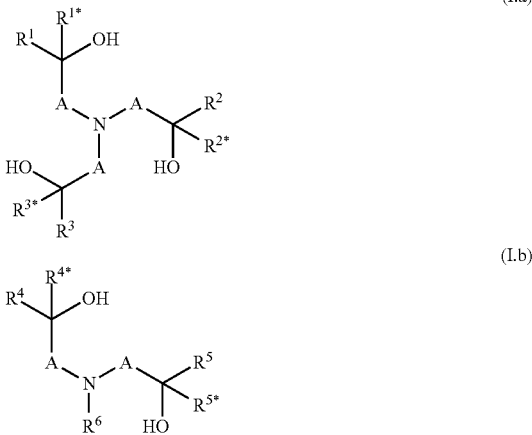

wherein
A is independently selected from $C_1$-$C_6$-alkylene,
$R^1$, $R^{1*}$, $R^2$, $R^{2*}$, $R^3$, $R^{3*}$, $R^4$, $R^{4*}$, $R^5$, $R^{5*}$ and $R^6$ are independently of one another selected from hydrogen, alkyl, cycloalkyl or aryl, wherein the last three mentioned radicals may be optionally substituted, and
a2) is at least one compound selected from polyols of formula $Y(OH)_n$,
wherein
n is an integer from 2 to 4, and
Y denotes a bivalent, trivalent or tetravalent aliphatic, cycloaliphatic or aromatic radical having 2 to 10 carbon atoms, and $R^y$ has one of the meanings given for $R^6$ or two radicals $R^y$ together may form a $C_1$-$C_6$-alkylene group,
wherein the sum of the amount of components a1), a2) and a3) is more than 70 wt.-% in relation to the sum of the amount of all monomers employed in the condensation according to step a) in order to obtain a polyether having remaining hydroxyl groups and optionally remaining secondary amino groups, and
b) reacting a part of the remaining hydroxy groups and optionally a part of the remaining secondary amino groups of the polyether obtained in step a) with at least one alkylene oxide, wherein the ratio of i) the alkylene oxide versus ii) the sum of the amount of the remaining hydroxyl groups and optionally the remaining secondary amino groups is >0:1 to <1:1 [mol/mol].

2. The polymer obtainable by the process according to claim 1, wherein in step b) the reaction of the remaining hydroxy groups and optionally of the remaining secondary amino groups with the at least one alkylene oxide is performed in the presence of a catalyst, wherein the catalyst is a base.

3. The polymer according to claim 1, wherein in component a1) in formulae (I.a) and/or (I.b)
i) A is a methylene group, which is unsubstituted or carries one substituent selected from $C_1$-$C_4$-alkyl, and/or
ii) $R^1$, $R^{1*}$, $R^2$, $R^{2*}$, $R^3$, $R^{3*}$, $R^4$, $R^{4*}$, $R^5$, $R^{5*}$ and $R^6$ are independently of one another selected from hydrogen and $C_1$-$C_4$-alkyl.

4. The polymer according to claim 1, wherein
i) in component a2) the polyol is an aliphatic polyol, a cycloaliphatic polyol, or an arylaliphatic polyol, and/or
ii) in component a3) the polyamine is selected from ethylenediamine, N,N'-dimethylethylenediamine, N,N'-diethylethylenediamine, 1,2-diaminopropane, 1,3-diaminopropane, 1,2-diaminocyclohexane, 1,3-diaminocyclohexane, 1,4-diaminocyclohexane or piperazine.

5. The polymer according to claim 1, wherein the sum of the amount of components a1), a2) and a3) is more than 90% in relation to the sum of the amount of all monomers employed in the condensation according to step a).

6. The polymer according to claim 1, wherein
i) 50 to 100 wt. % of component a1),
ii) 0 to 50 wt. % of component a2), and
iii) 0 to 50 wt. % of component a3)
are employed in relation to the sum of the amount of all monomers of step a).

7. The polymer according to claim 1, wherein
at least 95 wt.-% of all monomers employed in step a) are selected from component a1).

8. The polymer according to claim 1, wherein in step b) the at least one alkylene oxide is selected from epoxyethane, epoxypropane, 1,2-epoxybutane, (butylene oxide) 2,3-epoxybutane, 1,2-epoxy-2-methylpropane, 1,2-epoxypentane, 2,3-epoxypentane, 1,2-epoxy-2-methylbutane, 2,3-epoxy-2-methylbutane, 1,2-epoxyhexane, 2,3-epoxyhexane, 3,4-epoxyhexane, 1,2-epoxyethylenebenzene, 1,2-epoxydecane (decene oxide), 1,2-epoxydodecane (dodecene oxide), 1,2-epoxytetradecane and/or 1,2-epoxyhexadecane.

9. The polymer according to claim 1, wherein in step b) the ratio of i) the alkylene oxide versus ii) the sum of the amount of the remaining hydroxy groups and optionally the remaining secondary amino groups is 0.1:1 to 0.7:1 [mol/mol].

10. The polymer according to claim 1, wherein in step b) the ratio of i) the alkylene oxide versus ii) the sum of the amount of the remaining hydroxy groups and optionally the remaining secondary amino groups is 0.4:1 to 0.7:1 [mol/mol], and the alkylene oxide is butylene oxide.

11. The polymer according to claim 1, wherein in step b) the ratio of i) the alkylene oxide versus ii) the sum of the amount of the remaining hydroxy groups and optionally the remaining secondary amino groups is 0.1:1 to 0.7:1 [mol/mol], and the alkylene oxide is dodecene oxide.

12. The polymer according to claim 1, wherein in step b)
  i) the polymer has a number average molecular weight of from 500 to 100 000 g/mol, wherein the number average molecular weight of the polymer is determined by size exclusion chromatography with hexafluoroisopropanol as eluent, and/or
  ii) the average degree of alkoxylation is in the range from >0 to <1.

13. A process for preparing the polymer according to claim 1, wherein the process comprises the steps a) and b):
  a) condensing at least one component a1), optionally at least one component a2) and/or optionally at least one component a3), which are defined as follows:
    a1) is at least one compound selected from N-(hydroxyalkyl)amines of formulae (I.a) and/or (I.b),

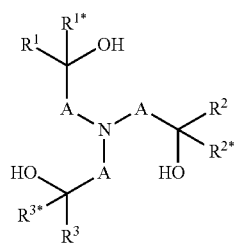

(I.a)

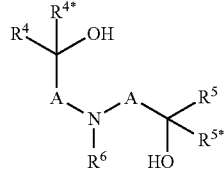

(I.b)

wherein
A is independently selected from $C_1$-$C_6$-alkylene,
$R^1, R^{1*}, R^2, R^{2*}, R^3, R^{3*}, R^4, R^{4*}, R^5, R^{5*}$ and $R^6$ are independently of one another selected from hydrogen, alkyl, cycloalkyl or aryl, wherein the last three mentioned radicals may be optionally substituted, and
    a2) is at least one compound selected from polyols of formula $Y(OH)_n$,
      wherein
      n is an integer from 2 to 4, and
      Y denotes a bivalent, trivalent or tetravalent aliphatic, cycloaliphatic or aromatic radical having 2 to 10 carbon atoms, and
    a3) is at least one compound selected from polyamines of formula $Y'(NHR^y)_m$,
      wherein
      m is an integer from 2 to 4,
      Y denotes a bivalent, trivalent or tetravalent aliphatic, cycloaliphatic or aromatic radical having 2 to 10 carbon atoms, and
      $R^y$ has one of the meanings given for $R^6$ or two radicals $R^y$ together may form a $C_1$-$C_6$-alkylene group,
      wherein the sum of the amount of components a1), a2) and a3) is more than 70 wt.-% in relation to the sum of the amount of all monomers employed in the condensation according to step a) to obtain a polyether having remaining hydroxyl groups and optionally remaining secondary amino groups, and
  b) reacting a part of the remaining hydroxy groups and optionally a part of the remaining secondary amino groups of the polyether obtained in step a) with at least one alkylene oxide, wherein the ratio of i) the alkylene oxide versus ii) the sum of the amount of the remaining hydroxyl groups and optionally the remaining secondary amino groups is >0:1 to <1:1 [mol/mol].

14. A derivate of the polymer according to claim 1, wherein the derivate is obtainable by quaternization, protonation, sulphation and/or phosphation of said polymer.

15. A process for preparing the derivate according to claim 14 further comprising step c), wherein step c) includes subjecting the polymer obtained in step b) to quaternization, protonation, sulphation and/or phosphation.

16. The polymer according to claim 1, wherein at least 99 wt.-% of all monomers employed in step a) are selected from the group consisting of component a1), wherein component a1) is selected from the group consisting of at least one compound according to formula (I.a).

* * * * *